Figure 1:
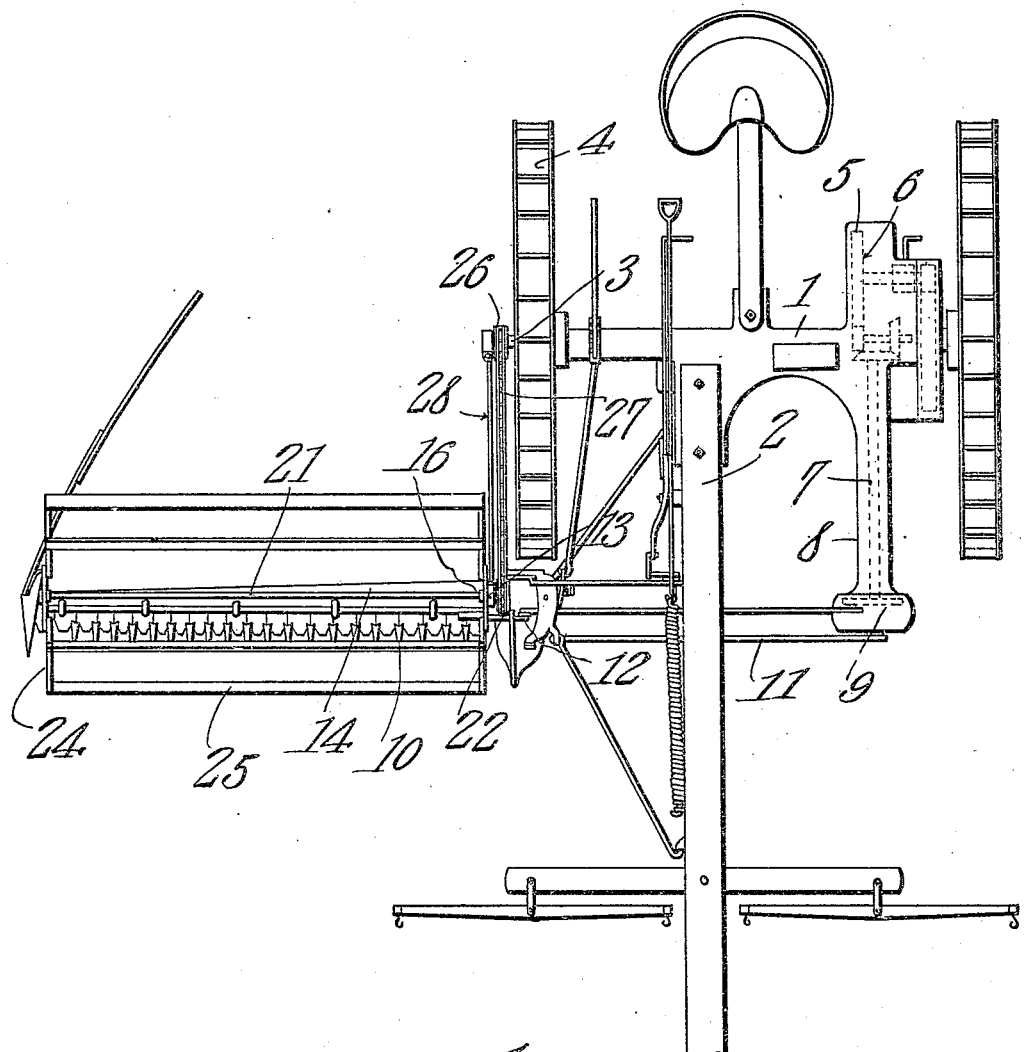

J. A. PURA.
MOWING MACHINE.
APPLICATION FILED OCT. 22, 1909.

959,882.

Patented May 31, 1910.
2 SHEETS—SHEET 1.

Witnesses

Inventor
John A. Pura.
By C. A. Snow & Co.
Attorneys

J. A. PURA.
MOWING MACHINE.
APPLICATION FILED OCT. 22, 1909.
959,882.
Patented May 31, 1910.
2 SHEETS—SHEET 2.
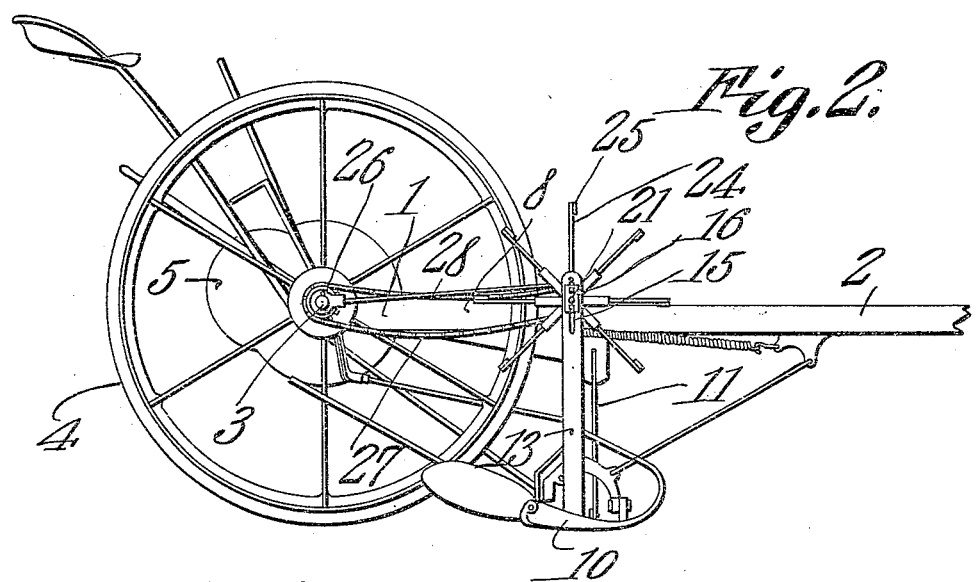
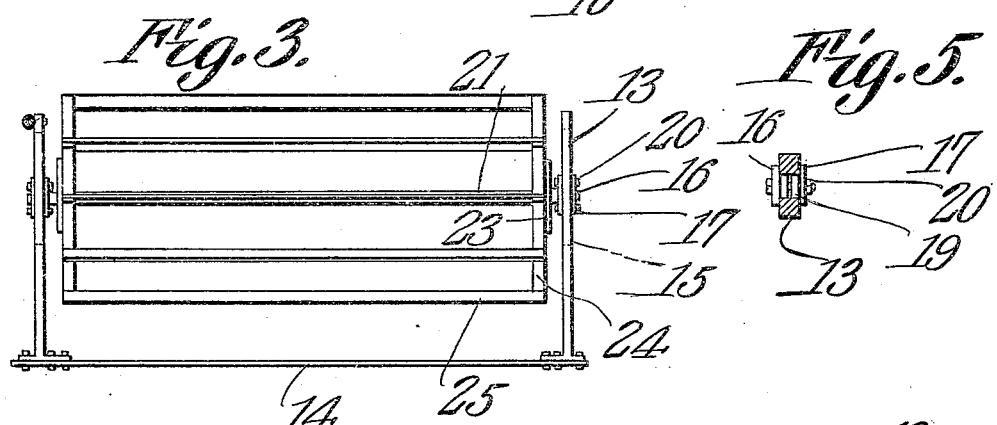
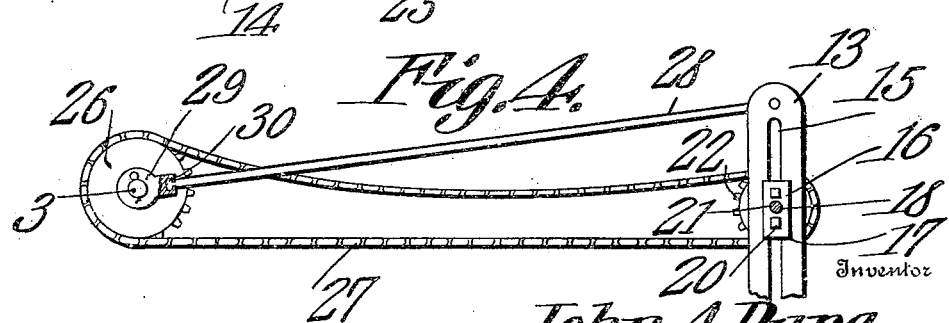
Witnesses
Inventor
John A. Pura.
By C. A. Snow & Co.
Attorneys

UNITED STATES PATENT OFFICE.

JOHN A. PURA, OF GONZALES, CALIFORNIA.

MOWING-MACHINE.

959,882.     Specification of Letters Patent.     Patented May 31, 1910.

Application filed October 22, 1909. Serial No. 524,022.

*To all whom it may concern:*

Be it known that I, JOHN A. PURA, a citizen of the United States, residing at Gonzales, in the county of Monterey and State of California, have invented a new and useful Mowing-Machine, of which the following is a specification.

This invention has relation to mowers and it consists in the novel construction and arrangement of its parts as hereinafter shown and described.

The object of the invention is to provide a mower of simple construction and arrangement of parts and which comprises a frame in which is journaled an axle in the usual manner, traction wheels are mounted at the ends of the said axle and the axle is operatively connected with the forwardly and downwardly disposed shaft which in turn is operatively connected with the sickle bar of the cutting apparatus. The parts are so geared as to cause the sickle bar to reciprocate at a relatively fast rate of speed.

A further object of the invention is to provide a reel structure adapted to be applied to the finger bar of the cutting apparatus. The said reel structure includes standards, upon which are adjustably mounted journal bearings. A reel shaft is journaled in the said bearings and is operatively connected with the main shaft of the mower 4. A brace extends from the main shaft of the mower to one of the said standards. By providing a mower with a reel structure as indicated, the mower may be used for cutting short grain and can also be used to advantage for cutting grass in windy weather, or when the grass is in a tangled state as the reel will materially assist in positioning and supporting the grain or grass at the time it is operated upon by the knives carried by the sickle bar.

In the accompanying drawings,—Figure 1 is a top plan view of the mower. Fig. 2 is a side elevation of the same. Fig. 3 is a rear elevation of the cutting apparatus with the reel structure applied thereto. Fig. 4 is a side elevation of a portion of the reel structure. Fig. 5 is a transverse sectional view through one of the standards of the reel structure.

As illustrated in the accompanying drawings, the mower includes a frame 1 to which is attached the rear end of a tongue 2 in the usual manner. An axle shaft 3 is journaled for rotation in the frame 1 and traction wheels 4 are mounted upon the end portions of the said axle shaft in the usual manner.

A housing 5 is formed upon the frame 1 and contains a train of gear wheels 6 which operatively connect the axle shaft 3 with a shaft 7 which in turn is journaled in a forwardly and downwardly projecting arm 8 which forms a portion of the frame 1. A disk 9 is fixed to the portion of the shaft 7 and a cutting apparatus 10 is pivotally connected with the frame 1 and its extensions in the usual manner. A pitman bar 11 operatively connects the disk 9 with the sickle bar 12 of the cutting apparatus in the usual manner. The parts are so proportioned and geared that the sickle bar 12 will reciprocate at a relatively high rate of speed.

Standards 13 are mounted upon the end portions of the finger bar 14 of the cutting apparatus 10 and at their upper portions the said standards 13 are provided with vertically disposed elongated slots 15. Bearings 16 are adjustably mounted in the standards 13 and each bearing comprises binary plates 17 having registering shaft openings 18 and oppositely disposed webs 19 adapted to enter the slots 15 in the standards 13. The plates 17 are held together by clamp bolts 20 which also pass through the slots 15 in the standards 13. By this arrangement it will be seen that by loosening the bolts 20 that the bearings 16 may be adjusted along the standards 13, and when in proper position can be secured by tightening the said bolts 20.

A reel shaft 21 is journaled at its end portion in the bearings 16 and a sprocket wheel 22 is fixed to the inner end of the said reel shaft 21. Disks 23 are fixed to the reel shaft at points within the bearings 16 and radially disposed arms 24 are carried by the said disks 23. The outer ends of the arms 24 upon one disk 23 are connected with the outer ends of the arm 24 upon the other disk by the battens 25. A sprocket wheel 26 is fixed to the end of the axle shaft 3 at a point beyond the outer side of the traction wheel 4 adjacent the cutting apparatus 10 and a sprocket chain 27 passes around the sprocket wheels 26 and 22. The chain 27 is sufficiently loose to permit of the vertical adjustment of the bearings 16 as above described. An arm 28 is pivotally connected at its forward end with the inner standard 13 and at its rear end is provided with a bearing 29 which snugly receives the projecting end of the axle shaft 3. Preferably a swiveled joint 30 is provided between the rear end of the arm 28 and the bearing 29. The arm 28 and its attachment serves as means for bracing the reel structure and for holding the reel in proper position to cause the material being operated upon to assume erect positions as it is engaged by the knives upon the sickle bar and to pass promptly over the cutting apparatus after it has been severed. By providing the standard 13 with the elongated slots 15 and bearings 16 adjustably mounted upon the said standards along the said slots, the reel-proper of which the parts 21, 23, 24 and 25 are the principal members, may be adjusted vertically in order to operate upon grain or grass of different heights. It will also be seen that while the reel structure is braced in its position upon the cutting apparatus, there is sufficient flexibility or play at the joints of the parts which connect the reel structure with the axle shaft of the motor to permit of limited vertical movement on the parts of the cutting apparatus and a certain amount of vertical swing of the same.

Having described my invention what I claim as new and desire to secure by Letters Patent is:—

A mower including an axle shaft and a pivoted cutting apparatus, standards mounted upon the cutting apparatus, a reel journaled for rotation upon the standards, means operatively connecting the reel with the axle shaft, and a swiveled brace rod connected at one end with one of the standards and at its other end with the axle shaft.

In testimony that I claim the foregoing as my own, I have hereto affixed my signature in the presence of two witnesses.

JOHN A. PURA.

Witnesses:
A. K. LAZIER,
LEWIS H. BRITTON.